COMPENSATED BEAM DEFLECTION SYSTEM

Filed April 28, 1961

INVENTORS
Albert W. Massman
BY Raymond C. Voige.
Mueller & Aichele
Attys.

United States Patent Office 3,174,073

Patented Mar. 16, 1965

3,174,073

COMPENSATED BEAM DEFLECTION SYSTEM

Albert W. Massman, Wheaton, and Raymond C. Voige, Chicago, Ill., assignors to Motorola, Inc., Chicago, Ill., a corporation of Illinois Filed Apr. 28, 1961, Ser. No. 106,384
7 Claims. (Cl. 315—27)

Figures 1, 2:
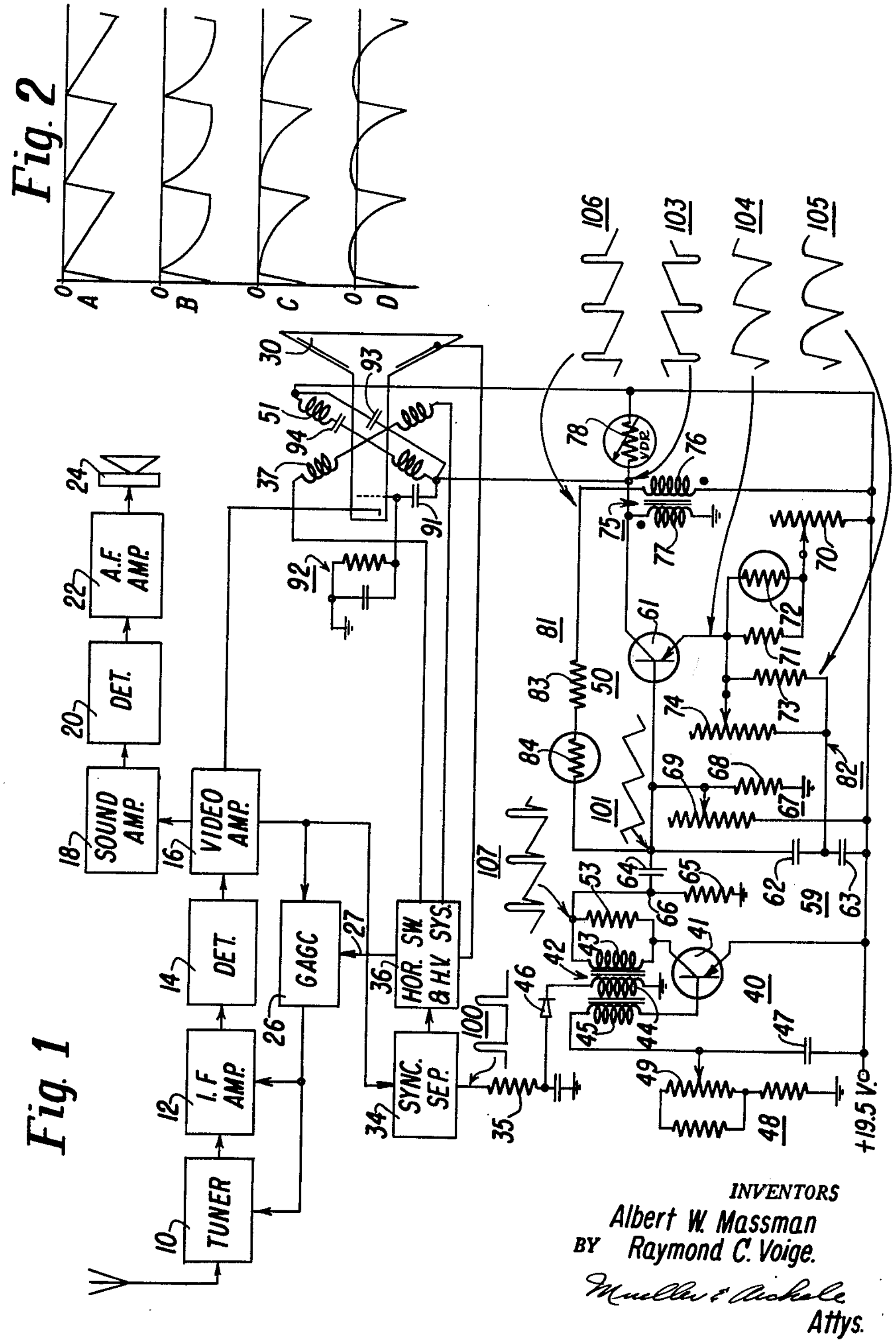

This invention relates in general to transistorized television receivers and in particular to a transistorized vertical deflection circuit for generating a sawtooth wave signal having improved linearity characteristics.

Low power requirements and extremely small size render transistors highly desirable for use in television receivers, particularly so in such receivers intended for portable usage. While some portions of the circuitry standardized for vacuum tubes may readily accept the substitution of transistors with minimum modification, other portions may require some change for optimum performance.

Particularly, a problem has been presented in transistorized vertical deflection systems in maintaining a substantially linear sawtooth wave signal for application to a magnetic deflection yoke on the cathode ray tube. It is known that transistors exhibit less than perfect linear transfer characteristics. Further non-linearity may be introduced by the tendency of a transistor to exhibit decreasing input impedance with an increasing rate of conduction thereby "flattening off" the sawtooth drive signal at its terminal end, manifested as undesirable compression at the bottom of the picture presentation. A further variance in the linearity characteristics may be introduced due to temperature variations affecting the current gain characteristics of a transistor.

It is therefore an object of the present invention to provide a new and improved transistorized vertical deflection circuit for developing and applying a substantially linear sawtooth wave signal to a magnetic deflection yoke.

Another object of the invention is to provide an improved linearity correction network for such a transistorized vertical deflection circuit.

Another object of the invention is to render vertical size and linearity in such a transistorized vertical deflection circuit substantially independent of temperature variations.

Still another object of the invention is to provide a transistorized deflection signal generator requiring moderate synchronizing drive power and displaying desirable frequency stability.

A feature of the present invention is the provision of a transistorized vertical deflection circuit having an improved linearity correction network formed by separate feedback loops wherein non-linear transistor transfer characteristics and varying input impedance are effectively compensated in an output transistor deflection stage.

Another feature is the provision of a transistorized vertical deflection circuit utilizing negative coefficient resistors to render the vertical size and linearity characteristics substantially independent of temperature variations.

Still another feature is the provision of a transistorized vertical deflection circuit wherein the bias voltage applied to the transistor vertical output stage is changed upon a decrease in its input impedance due to temperature rise to prevent non-linearity of the driving signal.

In the drawing:

FIG. 1 is a partial block and schematic diagram of a television receiver illustrating the present invention; and FIG. 2 is a series of curves useful in explaining the operation of the circuit of the invention.

In practicing the invention, a transistorized vertical deflection circuit is provided in a television receiver wherein separate feedback loops are included in the circuitry of the vertical output stage to peak the terminal portion of the sawtooth wave signal to compensate for decreasing input impedance with an increasing conduction rate which may tend to flatten out the wave signal. Negative temperature coefficient resistors are utilized in the base and emitter electrode networks whereby the vertical size and linearity characteristics of the circuit transistor are rendered substantially independent of temperature variations. Further, a transformer is incorporated as part of the vertical output stage collector load circuit and a secondary winding of the transformer is utilized as a component part of one of the feedback loops. The winding is coupled at one end to B+ such that the bias voltage applied to the transistor is automatically increased to prevent non-linearity of the drive signal when the temperature rise in the transistor reduces the input impedance.

Referring now to FIG. 1, the illustrated television receiver may be battery operated and all transistorized, except for the picture tube and the high voltage rectifier. The receiver includes a tuner 10 which selects the signals from an associated antenna to convert a received signal to a fixed frequency for further selection and amplification in the IF amplifier 12. Amplifier 12 is coupled to the detector 14 which demodulates a received composite video signal having line and frame synchronizing components, video frequency components, and a modulated sound carrier. The demodulated television signal is applied to the video amplifier 16 and this circuit provides the sound sub-carrier which is coupled to the sound amplifier 18. The sound signal is then applied to a sound detector 20 and the demodulated sound signal is amplified in the audio frequency amplifier 22 in order to drive the loudspeaker 24. The demodulated television signal is also applied through a direct current circuit from the detector 14 and through the video amplifier 16 to the gated automatic gain control circuit 26. Circuit 26 is gated by means of a pulse occurring at the line or horizontal deflection frequency applied thereto over lead 27. A control potential developed by circuit 26 and having a value dependent upon the strength of the received signal is applied to tuner 10 and IF amplifier 12 for regulating the gain thereof.

The detected and amplified video signal from amplifier 16 is applied to the cathode of the image reproducer or cathode ray picture tube 30. Video amplifier 16 is further coupled to the synchronizing signal separator circuit 34 which amplitude separates both the frame and line synchronizing signal components of the composite video signal. The line or horizontal synchronizing signal, is then applied to the horizontal deflection circuit 36 which develops a suitable sawtooth scanning current in the horizontal deflection winding 37 disposed on the neck of the cathode ray tube 30 as well as providing the high voltage to the screen of the tube.

Synchronizing signal separator circuit 34 is also connected to the vertical oscillator stage 40 which generates output pulses in response to vertical synchronization signals of the received signal. The pulse signals from the output of vertical oscillator stage 40 are applied to vertical output stage 50 which develops and applies the sawtooth wave current components to deflection winding 51 for vertical deflection of the cathode ray beam.

Considering now the specific operation of circuits 40 and 50, sync separator circuit 34 applies suitable synchronization signals, illustrated as wave form 100, to input winding 44 of pulse transformer 42 through load resistor 35 and coupling diode 46. Diode 46 serves to block feedback from the vertical blocking oscillator stage 40 to sync separator circuit 34. Oscillator stage 40 includes a transistor 41 with base and collector electrodes coupled to windings 45 and 43 respectively of transformer 42, forming therewith a blocking oscillator for generating pulses of field frequency and applying these to a passive integrating network for developing the required sawtooth wave signal. The pulse width is largely determined by the characteristics of pulse transformer 42 while the repetition frequency is a function of resistive network 48 and capacitor 47. The frequency (vertical hold) may be adjusted by potentiometer 49 which varies the R-C time of network 48–47. Transistor 41 is driven into conduction by the input pulse applied to the base, and capacitor 47 is charged. The output collector pulse is regeneratively fed back through transformer 42. Saturation of transistor 41 causes a regenerative pulse which holds the transistor in saturation. The collapsing transformer field will cut off the transistor. Subsequent discharge of capacitor 47 will prepare the circuit for another sync pulse or will permit transistor conduction for free running operation. Resistor 53 shunting transformer winding 43 provides damping action on the inductive effect of the pulse transformer to prevent the generation of high voltage spikes in excess of the collector breakdown rating of transistor 41.

Passive network 59 is the sawtooth forming circuitry consisting of capacitors 62 and 63 connected with capacitor 64 from the collector output circuit of transistor 41 to B+. Resistor 65 is connected between junction 66 and ground as an output load for stage 40. Capacitors 62 and 63 are exponentially charged through voltage divider network 67 to a potential existing at the arm of potentiometer 69 during the trace interval and are rapidly discharged by the oscillator 40 during the retrace interval. The RC time constant of network 59 is selected to provide a linear sawtooth signal therefrom, as illustrated by waveform 101.

The vertical scanning rate is standardized at 60 scans per second, and the vertical winding 51 of the magnetic deflection yoke appears as a purely resistive load during the trace interval. Therefore, with an amplified sawtooth wave signal from the output of vertical deflection stage 50 applied to the deflection winding 51, a magnetic field is produced therein for linear deflection of the scanning cathode ray beam. The relatively high amplitude fly-back pulses, graphically displayed in waveform 103, are the result of the inductive characteristic of winding 51 during retrace time. Voltage sensitive resistor 78 connected in parallel with deflection winding 51 serves to effectively suppress these high voltage spikes.

Potentiometer 70 is connected from emitter bias resistor 71 to B+ to provide a variable gain adjustment for transistor 61 for controlling the vertical size of the picture presentation. Potentiometer 69 in voltage divider network 67 provides a variable bias adjustment for the transistor of stage 50 and is required since the current amplification may not be the same for different transistors.

As previously mentioned, the linearity of the sawtooth waveform developed across capacitors 62 and 63 is dependent upon the RC time constant of network 59. As the input impedance of transistor 61 is effectively in shunt with sawtooth forming capacitors 62 and 63, it will be seen that any variance in such input impedance will vary the linearity of the sawtooth wave signal so formed. Since the input impedance exhibited by transistors may decrease with an increasing rate of conduction, it will be seen that a resultant non-linearity is introduced in the form of flattening or leveling off of the sawtooth wave signal at its peak or terminal end which is manifested as undesirable compression at the bottom of the picture presentation. A further form of non-linearity is introduced in the sawtooth waveform as a result of the less than perfect transfer characteristics inherent in transistors.

To compensate for the aforementioned non-linearities, two separate feedback networks are incorporated, represented as 81 and 82. The waveforms of FIG. 2 are particularly helpful in explaining the need for and the result of such linearity compensation. Waveform 2A represents an ideal sawtooth waveform as developed across capacitors 62 and 63. With the input impedance of transistor 61 decreasing with increasing conduction, the terminal portion of the input sawtooth wave form is flattened off to that represented in waveform 2B. To compensate, a positive feedback circuit 81 is incorporated to feed back from the output of transistor 61 to its input, represented as waveform 2C. In feedback circuit 81, feedback winding 76 of output transformer 75 is connected between B+ and the base electrode of transistor 61 through resistor 83 and thermistor 84. Winding 76 is inductively coupled to the output of transistor 61 with its polarity so arranged as to provide a 180° phase shift in the signal received from primary winding 77 such that the resultant signal fed back to the input of transistor 61 is inphase with the sawtooth drive signal applied thereto by sawtooth forming capacitors 62 and 63. This has the effect of peaking the terminal end of the sawtooth drive signal accordingly.

An additional positive feedback circuit 82 is incorporated, consisting of potentiometer 74 in parallel with resistor 73 being direct current connected between the emitter electrode of transistor 61 and the junction of sawtooth forming capacitors 62 and 63. The sawtooth signal appearing at the emitter electrode is essentially as represented by waveform 104 in FIG. 1. By feeding back a portion of this signal to integrating capacitor 62, represented by waveform 2D in FIG. 2, the curvature of it compensates for the nonlinear transistor transfer characteristics. Linearity control 74 controls the amplitude and wave shaping of the sawtooth and thus the degree of linearity correction.

It will be recognized that a rise in the temperature of transistor 61 will produce a corresponding increase in the conduction of it, which, without further compensation, will cause a shift in its operating point and a resultant non-linearity in the sawtooth drive signal amplified therein. Further non-linearity may be introduced by reason of the decrease in input impedance exhibited by the transistor with an increase in conduction. By returning feedback winding 76 of transformer 75 to B+ instead of ground, a decrease in resistance of thermistor 84 occurs with an increase in ambient temperature such that a more positive direct current voltage is applied to the base electrode through winding 76 to effectively bias transistor 61 more toward cutoff and thereby stabilize its operating point. Further, the non-linearity resulting from a decrease in input impedance exhibited by transistor 61 on a temperature rise is effectively compensated by the increase in the alternating current signal fed back through transformer 75 as a result of the decrease in resistance of thermistor 84. In addition, thermistor 77 in shunt with emitter resistor 71 decreases in resistance with an increase in temperature to maintain the current gain of transistor 61 constant and thereby maintain constant vertical size for the picture presentation.

Full compensation is therefore provided for transistor 61 with respect to variations in the temperature of the circuit. Thermistor 84 regulates the alternating current feedback signal to compensate for variations in input impedance; thermistor 84 also regulates the direct current bias voltage to stabilize the operating point; and thermistor 72 operates to maintain constant current gain.

Capacitor 93, in shunt with deflection winding 51, serves to prevent the high frequency horizontal signals from entering the vertical deflection system while capacitor 94, in series with the vertical deflection windings, effectively blocks direct current components therefrom. Coupling capacitor 91 connected between the grid of picture tube 30 and the vertical deflection winding 51, together with filter network 92 connected between grid and ground, provides the required vertical blanking action between picture frames.

In the disclosed embodiment of the invention it has been found that components of the following types and values provide satisfactory results:

| | |
|---|---|
| Transistor **61** | Type 4461 (Motorola). |
| Capacitor **62** | 300 microfarads. |
| Capacitor **63** | 300 microfarads. |
| Capacitor **64** | 300 microfarads. |
| Resistor **65** | 220 ohms. |
| Resistor **68** | 3,900 ohms. |
| Potentiometer **69** | 1000 ohms. |
| Potentiometer **70** | 10 ohms. |
| Resistor **71** | 2.7 ohms. |
| Thermistor **72** | 275 ohms (cold). |
| Resistor **73** | 82 ohms. |
| Potentiometer **74** | 200 ohms. |
| Transformer **75** | 200 ohms at 60 c.p.s. |
| Varistor **78** | 2500 ohms (at 20 v. D.C.). |
| Resistor **83** | 220 ohms. |
| Thermistor **84** | 275 ohms (cold). |

The invention therefore provides a transistorized vertical deflection system for a television receiver having an improved linearity correction network formed by two separate regenerative feedback circuits included in the vertical output stage. Such feedback effectively compensates for inherent circuit non-linearities by controlling the shape of the sawtooth drive signal as well as providing further circuit stability by regulating the bias voltage according to the applied drive signal. In addition, provisions are included to render the vertical size and linearity characteristics independent of temperature variations.

We claim:

1. A deflection system for developing a sawtooth deflection signal for a cathode ray tube in response to a synchronization signal, said system including in combination, a source of synchronizing signals, a deflection stage including a transistor having input, output, and common electrodes, a resistor-capacitor network coupled to said source of synchronizing signals and said input electrode for applying a sawtooth wave signal to said input electrode of said transistor, output circuit means coupled to said output electrode for developing a sawtooth wave signal for the cathode ray tube, and feedback means forming a linearity correction network including first and second feedback loops, said first feedback loop including means for coupling a signal at the frequency of the sawtooth signal and in phase therewith to said input electrode from said output electrode to peak the end portion of the sawtooth wave signal, said second feedback loop including means for coupling a further signal to said input electrode from said common electrode to provide further linearity correction for the sawtooth wave signal.

2. In a vertical deflection system for applying a sawtooth current wave signal to a magnetic deflection yoke in response to a synchronizing signal; an output deflection stage including a transistor having base, collector and emitter electrodes, means for producing pulses in response to synchronizing signals, integration means coupled to said pulse producing means and including first and second capacitors connected end-to-end between said base electrode and a reference potential for applying a sawtooth wave signal to said base electrode of said transistor, a load circuit including said deflection yoke coupled to said collector electrode for utilizing the amplified sawtooth current wave signal therefrom, said transistor exhibiting non-linear transfer characteristics and decreasing input impedance with increasing conduction whereby the tendency is for the terminal portion of a sawtooth drive signal to be undesirably flattened, and feedback means forming a linearity correction network including first and second positive feedback loops, said first loop including resistance means connected from said emitter electrode to the junction of said sawtooth forming capacitors and forming therewith a wave shaping network to compensate said non-linear transfer characteristics and having an adjustable element for varying said compensation, said second loop including phase inverting means and further resistance means coupled from said collector electrode to said base electrode for feeding back a regenerative signal to said base electrode to compensate for said decreasing input impedance exhibited by said transistor with increasing conduction, thereby providing effective peaking of the terminal portion of the sawtooth drive signal.

3. A deflection system for developing a sawtooth deflection signal for a cathode ray tube in response to a synchronizing signal, said system including in combination, a transistor having input, output and common electrodes, a sawtooth forming network including a resistive voltage divider connected to said input electrode and first and second capacitors connected end-to-end across a portion of said voltage divider, a pulse producing synchronizing circuit connected to said input electrode, a direct current bias network connected to said common electrode, an output load inductance connected to said output electrode and including a deflection yoke winding adapted to be disposed upon the cathode ray tube, a first regenerative feedback network including a feedback winding inductively coupled to said load inductance and resistance means connected betwen said feedback winding and said input electrode for developing a linearity compensating signal component of deflection frequency in conjunction with said first and second capacitors, a second regenerative feedback including resistor means connected between said common electrode and the junction of said first and second capacitors for applying a further signal component to said sawtooth forming network for linearizing the drive waveform for said transistor.

4. A deflection system for developing a sawtooth deflection signal for a cathode ray tube in response to a synchronizing signal, said system including in combination, a transistor having input, output and common electrodes, a sawtooth forming network including a resistive voltage divider connected to said input electrode and capacitor means connected across a portion of said voltage divider, a pulse producing synchronizing circuit connected to said input electrode, a direct current bias network connected to said common electrode, an output load inductance connected to said output electrode and including a deflection yoke winding adapted to be disposed upon the cathode ray tube, and regenerative feedback means including a feedback winding inductively coupled to said load inductance, a bias source and a temperature sensitive resistor series connected with said feedback winding to said input electrode for developing a regenerative linearity compensating signal component of deflection frequency in conjunction with said capacitor means, said temperature sensitive resistor thereby regulating the magnitude of bias to said input electrode and the magnitude of said compensating signal in response to temperature variations to correct for change of input impedance of said transistor.

5. A deflection system for developing a sawtooth deflection signal for a cathode ray tube in response to a synchronizing signal, said system including in combination, a transistor having input, output and common electrodes, a sawtooth forming network including a resistive voltage divider connected to said input electrode and capacitor means connected across a portion of said voltage divider, a pulse producing synchronizing circuit connected to said input electrode, voltage supply means coupled to said common electrode of said transistor for energizing the same, an output load inductance connected to said output electrode and including a deflection yoke winding adapted to be disposed upon the cathode ray tube, and regenerative feedback circuit means including a feedback winding connected to said voltage supply means and resistance means including a temperature sensitive resistor series connected with said feedback winding to said input electrode for applying thereto a direct current bias voltage, said feedback winding being inductively coupled to said load impedance for developing an alternating current signal component of deflection frequency for linearity compensation in conjunction with said resistance means and said capacitor means, said temperature sensitive resistor being responsive to variations in temperature to regulate the magnitude of said alternating current signal component developed and also the direct current bias voltage applied to said transistor input electrode.

6. A deflection system for developing a sawtooth deflection signal for a deflection yoke disposed upon a cathode ray tube in response to a synchronizing signal, said system including in combination, a transistor having input, output and common electrodes, means for producing a sawtooth wave signal in response to a synchronizing signal including a resistive voltage divider connected to said input electrode and first and second capacitors connected end-to-end across a portion of said voltage divider, a pulse producing synchronization circuit connected to said input electrode, voltage supply means connected to said common electrode for energizing said transistor and including a first temperature sensitive resistor responsive to variations in temperature to regulate the applied voltage thereto, a load circuit connected to said output electrode and including a deflection yoke winding having a voltage sensitive resistor in shunt for suppressing high voltage spikes developed thereon during retrace, said transistor exhibiting non-linear transfer characteristics and decreasing input impedance with increasing conduction whereby the tendency is for the terminal portion of a sawtooth drive signal to be attenuated, and regenerative feedback means forming a linearity correction network including first and second feedback networks, said first feedback network including resistor means connected to said common electrode and the junction of said sawtooth forming capacitors for applying a compensating alternating current signal thereto for energizing the drive waveform for said transistor, said resistor means including an adjustable element for varying such compensation, said second feedback network including a feedback winding connected to said voltage supply means and resistance means including a second temperature sensitive resistor connected between said feedback winding and said input electrode for applying thereto a direct current bias voltage to determine the transistor operating point, said feedback winding being inductively coupled to said load impedance for further developing an alternating current compensation signal in conjunction with said resistance means and said capacitors to peak the terminal portion of said sawtooth drive signal, said second temperature sensitive resistor being responsive to variations in temperature to regulate the alternating current signal feedback of said second feedback network and also the direct current bias voltage applied to said transistor input electrode.

7. A deflection system for developing a sawtooth deflection signal for a cathode ray tube, including in combination, a source of synchronizing signals, a transistor having base, emitter and collector electrodes, a resistor-capacitor network coupled from said source to said base and emitter electrodes for applying a sawtooth signal to said transistor, output circuit means coupled to said collector electrode for developing a sawtooth wave signal for the cathode ray tube, said resistor-capacitor network including a feedback path for modifying the waveform of the sawtooth wave signal developed in said output circuit means, and a regenerative feedback and bias circuit including potential supply means and means for developing a feedback signal in phase with the sawtooth signal serially coupled to said base electrode to peak the end portion of the sawtooth wave signal and at least partially furnish bias for said base electrode.

References Cited in the file of this patent

UNITED STATES PATENTS

| | | |
|---|---|---|
| 2,445,017 | Boadle et al. | July 13, 1948 |
| 2,913,625 | Finkelstein | Nov. 17, 1959 |
| 2,914,685 | McVey | Nov. 24, 1959 |
| 2,954,504 | Saudinaitis et al. | Sept. 27, 1960 |
| 3,098,171 | Ashley | July 16, 1963 |
| 3,105,198 | Higginbotham | Sept. 24, 1963 |

OTHER REFERENCES

Palmer et al.: IRE Transactions on Broadcast and Television Receivers, October 1957, "Transistorized TV Vertical Deflection System," pp. 98–105.